United States Patent [19]

Lin

[11] Patent Number: 5,798,522

[45] Date of Patent: Aug. 25, 1998

[54] METHOD OF DRIVING A CASSETTE SCANNING SYSTEM

[75] Inventor: John Lin, Hsinchu, Taiwan

[73] Assignee: Mustek Systems Inc., Hsinchu, Taiwan

[21] Appl. No.: 828,809

[22] Filed: Apr. 3, 1997

[51] Int. Cl.$^6$ ............................................. H01L 27/00
[52] U.S. Cl. .................. 250/234; 250/208.1; 250/559.4; 358/488
[58] Field of Search ...................... 250/208.1, 234–236, 250/559.2, 559.26, 559.29, 559.31, 559.4; 355/311; 358/488; 356/375, 383, 384

[56] References Cited

U.S. PATENT DOCUMENTS 4,538,177  8/1985  Morison ................................. 358/93
5,693,933  12/1997  Takasu et al. ...................... 250/208.1

*Primary Examiner*—Stephone Allen
*Attorney, Agent, or Firm*—Sughrue, Mion, Zinn, Macpeak & Seas, PLLC

[57] ABSTRACT

A document holder is fed into a cassette scanning system. A first sensor that is set in the cassette scanning system detects whether the document holder is in the scanning system or not. Simultaneously, a second sensor is used to detect whether the document is inside the document holder or not. The scanning system is responsive to the first sensor and second sensor to drive the image sensor to capture the image of the document.

10 Claims, 3 Drawing Sheets

METHOD OF DRIVING A CASSETTE SCANNING SYSTEM

CROSS REFERENCE TO RELATED APPLICATION

This following copending U.S. patent application assigned to the assignee of the present invention is related to the present invention: Ser. No. 08/790,885 filed Feb. 3, 1997 and entitled "CASSETTE SCANNING SYSTEM".

FIELD OF THE INVENTION

The present invention relates to a scanning system, and more specifically, to a method for driving a cassette scanning system.

BACKGROUND OF THE INVENTION

Conventional scanning system can be approximately divided into two segments that are a handy scanning system and a flat-bed scanning system. A scanning system makes use of focusing a reflecting light beam through a photodetector to generate an image signal for further image processing. A conventional scanning system apparatus includes a light source, a mirror, and a lens set, which are used to guide the reflecting light to a charge coupled device (CCD). The charge couple device is utilized to generate an image signal. In such a scanning system, light is emitted from the light source and is then reflected from a document. The reflected light therefrom is further reflected by a mirror in predetermined direction and penetrates a projection lens set. An image is capture by a solid state imaging device. The device effects a photoelectric conversion into electrical signal.

Typically, image capture is achieved by passing the document in front of a device known as a CCD. This consists of a large of very small, individual semiconductor receptors, disposed in a linear array. The document is passed in front of the CCD and a complete image of the document linear segments individually captured from the CCD. A preprocessing element is then used to respond the image electrical signal and adjust dc gain of the image signal. An analogue to digital converter is used to convert adjusted image signal to a digital signal and a post-processing element to generate an image code.

The shading correction comprises two steps. In the first step, the one-bit pixel data items defining an image are corrected based on the difference between the black reference signal and the white reference signal, thereby forming corrected image data. In the second step, the low frequency distortion and high frequency distortion occurring in the data-reading unit are minimized in accordance with the corrected image data.

In practicing the scanning system, the light source is reflected from the surface of a document, then it is reflected against from the mirror and focused by a lens set. The mirror and the lens set are used to guide the light beam to a CCD. Subsequently, the light beam is converted to an image signal by the CCD, and direct current (d.c.) gain of the image signal is adjusted by a pre-processing element, i.e. a d.c. gain voltage amplifier. Then the adjusted image is fed to an analogue to digital converter (ADC) for converting adjusted image signal to a digital signal. The digital signal is fed to a post-processing element to generate an image code by processing the digital signal through highlight, shadow, and Gamma correction.

It has been a trend to fabrication a computer with a scanning system. In the other words, a scanning system has been implanted into a computer. Therefore, what is required is a method to drive a cassette scanning system that can be built in a computer system for the present demanded.

SUMMARY OF THE INVENTION

It is an object of the present invention to provide a method for driving a cassette scanning apparatus.

A document holder is fed into a cassette scanning system. Then, a first sensor that is set in the cassette scanning system detects the document holder is in the scanning system or not. At the same time, a second sensor is also set in the scanning system to detect whether the document is in the document holder or not. If the sensor detects the document holder and the document are both in the scanning system. The scanning system is responsive to the sensors to drive the image sensor for capturing the image of the document.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention discloses a driving method for a cassette scanning system that can be built in a computer system. The scanning system has a document holder for holding a document. In addition, the document holder can be separated from the scanning system.

Figure 1:
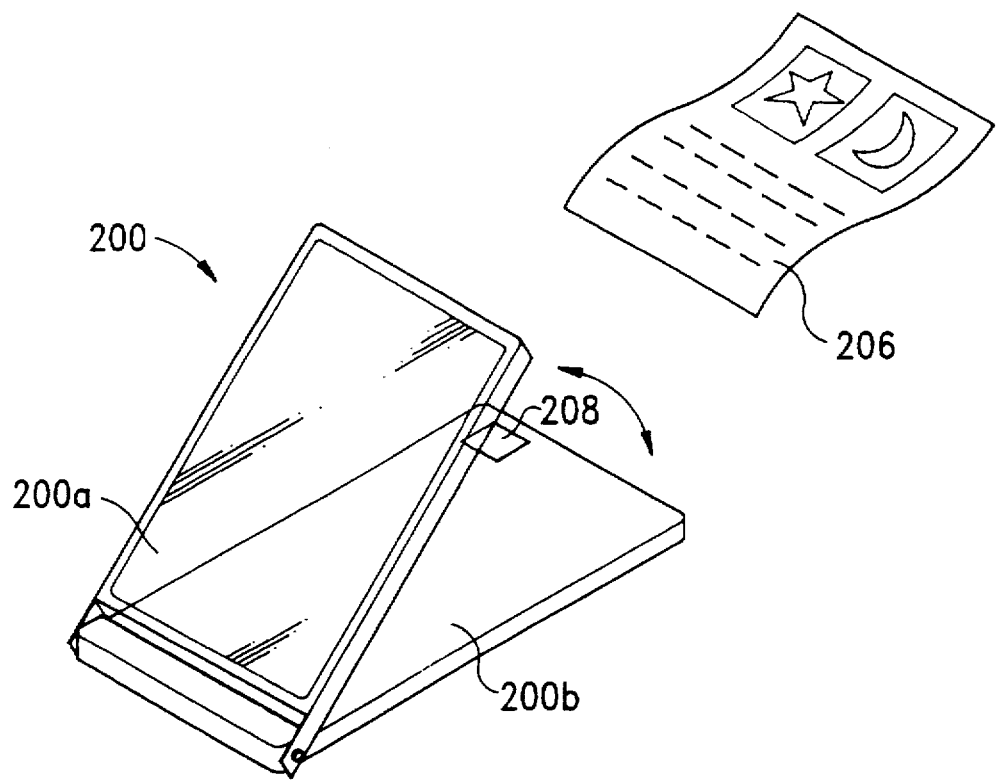
FIG. 1 is a schematic drawing of a document holder according to the present invention.

As shown in FIG. 1, the document holder 200 consists of a first cover 200a and a second cover 200b. One end of the first cover 200a is connected to one end of the second cover 200b. The document holder 200 can be pivotal opened in order to put a document 206 into the document holder 200. Further, at least a portion of one of the covers 200a, 200b has a plate that is made of transparent material such as glass, acrylic resin. This arrangement is used for the image of the document 206 that can be captured by an image sensor. For example, the first cover 200a is made of transparent material for capturing the image of the document 206 by an image capturing element. Further, the second cover 200b has at least a recognition region 208 where is made of transparent material. The recognition region 208 is used for the cassette scanning system to detect whether the document 206 is in the document holder 200 or not. The detail reson for forming the recognition region 206 will be described later. Alternatively, an opening can also serve the recognition region 208. It also can achieve the purpose by using the converse arrangement for the present invention.

Figure 2:
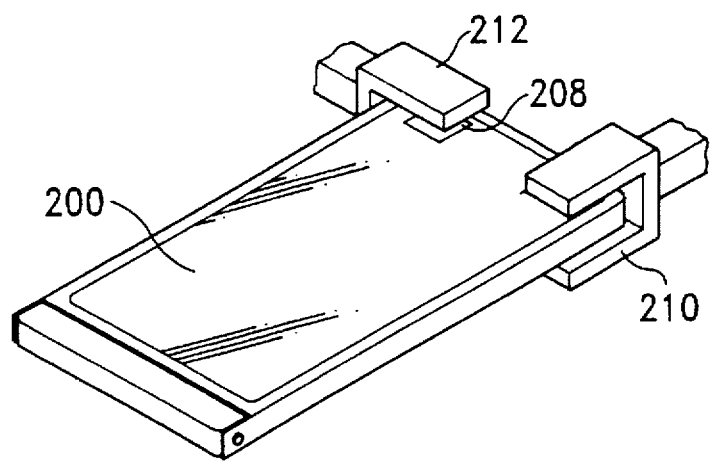
FIG. 2 is a schematic drawing illustrating the relationship among the document holder, a first photosensor and a second photosensor according to the present invention.

Turning to FIG. 2, in practicing the scanning system, the document 206 is put into the document holder 200. Then, the document holder 200 is fed into the cassette scanning system. The document holder 200 is fixed in the scanning system by a plurality of fixers after the document holder 200 is fed into the scanning system. A first sensor 210 is set in the cassette scanning system to detect whether the document holder 200 is in the scanning system or not. Similarly, a second sensor 212 is set in the scanning system to detect whether the document 206 is in the document holder 200 or not.

Figure 3:
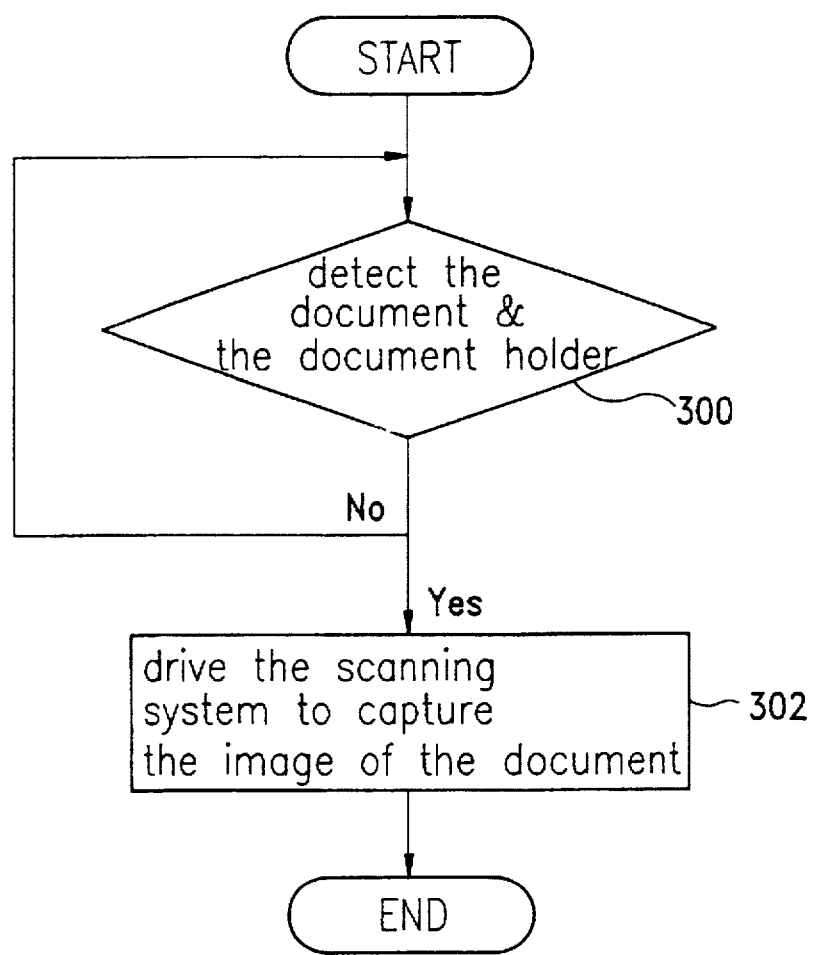
FIG. 3 is a flow chart illustrating a method according to one embodiment of the present invention.

FIG. 3 is a flow chart of a method to drive the scanning system according to one embodiment of the present invention. First, in step 300, the cassette scanning system detects whether the document holder 200 is in the system or not by using the first sensor 210. If the sensor 210 detects the document holder 200 is in the scanning system. Simultaneously, the second sensor 212 is used to detect whether the document 206 is in the document holder 206 or not in the same step. Subsequently, in the step 302, the scanning system is responsive to the sensors to drive an image capturing element to capture the image of the document 206. In a preferred embodiment, photodetectors are utilized to serve the first sensor 210 and the second sensor 212, respectively.

Figure 4:
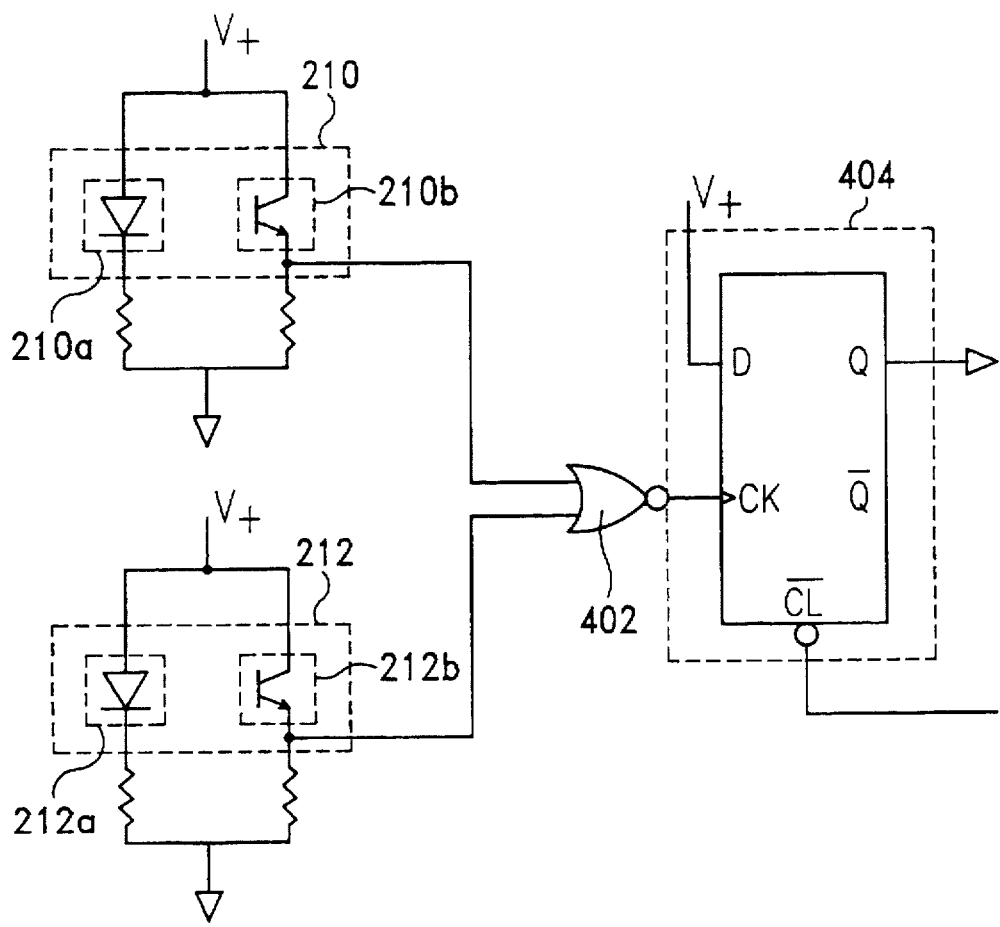
FIG. 4 is a circuit illustrating the photosensors, an NOR gate and a D flip-flop according to the present invention.

As shown in FIG. 4, it illustrates a circuit 400 according to the present invention to recognize whether the document holder 200 and the document 206 are both inside the scanning system or not. Preferably, the circuit 400 includes two photosensors 210, 212, an NOR gate 402 and a D flip-flop 404. As it is well known in the prior art, the photosensor 210 can be connected to a high voltage denoted by V+. Typically, the first photosensor 210 includes a first light-emitting diode (LED) 210a and a first transistor 210b. The document holder 200 is set between the first LED 210a and the first transistor 210b when the document holder 200 is fed into the scanning system. Therefore, when the document holder 200 is not inside the cassette scanning system, the first transistor 210b can receive the light that is emitted from the first LED 210a. Thus, the output of the photosensor 210 can be at high voltage depending on the type of the transistor 210b, for example, the transistor 210b is a phototransistor. While the document holder 200 is in the cassette scanning system, the first transistor 210b can not receive the light that is emitted from the first LED 210a due to the arrange of the present invention. Hence, the output of the first photosensor 210 is at low voltage.

Similarly, the second sensor 212 includes of a second LED 212a and 210 includes a first light-emitting diode (LED) 210a and a second transistor 212b. The recognition region 208 of the document holder 200 is also set between the second LED 212a and the second transistor 212b when the document holder 200 is fed into the scanning system. When the document holder 200 is not inside the cassette scanning system, the second transistor 212b can receive the light that is emitted from the first LED 212a. Thus, the output of the second photosensor 212 can be at high voltage depending on the type of the transistor 212b, for example, the transistor 210b is a phototransistor. Assume that the document holder 200 is in the cassette scanning system, further assume the document is not in side the document holder 206, the second transistor 212b still can receive the light via the recognition region 208. Hence, the output of the second photosensor 210 is still at high voltage. Conversely, the document 206 will cover the recognition region 208 to prevent the light from receving by the second transistor 212b. Thus, the output of the second transistor 212b is at low voltage.

Subsequently, the outputs of the first photosensor 210 and the second photosensor 212 are fed to the NOR gate 402. While the outputs of the two photosensor 210, 212 are both at low voltage, the output signal of the NOR gate 402 is at high voltage. Otherwise, the output signal of the NOR gate 402 is at the level of high. Then, the output signal of the NOR gate 402 is fed to the D flip-flop 404.

The output signal is fed to the D flip-flop 404 via the clock (CK) terminal. While the input signal is at high voltage, then the clock (CK) terminal is responsive to the signal will to change the state. The D terminal of the D flip-flop 404 is typically connected to high voltage (V+). Therefore, the output of the Q terminal will change the state. The changed state will be fed into a control unit of the cassette scanning system to drive the image sensor to capture the image of the document 206.

Conversely, while the low voltage is fed into the CK, the Q terminal of the D flip-flop 404 is responsive to the signal will not to change the state. Hence, the control unit is responsive to the signal for not driving the image sensor.

Turning to FIG. 3, in step 302, the image sensor is responsive to the changed state and be driven to scan the document 206. Therefore, in the step 302, the scanning system is responsive to the signal to drive the image sensor for capturing the image of the document 206. In this case, a contact image sensor (CIS) can be used to serve the image sensor 212. Alternatively, a charge couple device (CCD) can also be used to act the image sensor 212.

The advantage of the present invention is that the user does not need to push any button for driving the scanning system. In the other word, the scanning system is automatically driven by using the present invention.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for driving a scanning system, said scanning system having a document holder to hold a document, wherein said document holder having an opening for feeding said document into said document holder and said document holder can be fed into said scanning system, a first sensor being set in said scanning system to detect said document holder, a second sensor being set in said scanning system for detecting said document, a recognition region being formed on said document holder to recognize that said document being inside said document, said method comprising the steps of:

feeding said document holder into said scanning system; and detecting said document holder by using said first sensor and detecting said document by using said second sensor, simultaneously, an image capturing element being responsive to a signal of said first sensor and said second sensor to capture the image of said document.

2. The method of claim 1, wherein said scanning system further comprises a NOR gate and a D flip-flop to respond said first sensor, said second sensor.

3. The method of claim 2, wherein said first sensor is a first photosensor.

4. The method of claim 2, wherein said second sensor is a second photosensor.

5. The method of claim 3, wherein said first photosensor comprises a first light emitting diode (LED) and a first transistor.

6. The method of claim 4, wherein said photosensor comprises a second light emitting diode (LED) and a second transistor.

7. The method of claim 1, wherein said image capturing element is a contact image sensor (CIS).

8. The method of claim 1, wherein said image capturing element is a charge couple device (CCD).

9. The method of claim 1, wherein said recognition region is made of transparent material.

10. The method of claim 1, wherein said document holder further comprises an opening to serve said recognition region.

* * * * *

UNITED STATES PATENT AND TRADEMARK OFFICE
CERTIFICATE OF CORRECTION

PATENT NO. : 5,798,522  
APPLICATION NO. : 08/828809  
DATED : August 25, 1998  
INVENTOR(S) : John Lin Page 1 of 1

It is certified that error appears in the above-identified patent and that said Letters Patent is hereby corrected as shown below:

| Column | Line | |
|---|---|---|
| 2 | 55 | Change "where" to --which-- |
| 2 | 58 | Change "reson" to --reason-- |
| 2 | 59 | Change "206" to --208-- |
| 3 | 35 | Before "photosensor" insert --first-- |
| 3 | 41 | Change "arrange" to --arrangement-- |
| 3 | 43 | Delete "of" |
| 3 | 44-45 | Delete "and 210 includes a first light emitting diode (LED) 210a" |
| 3 | 51 | Change "first" to --second-- |
| 3 | 56 | Change "in side" to --inside-- |
| 3 | 59 | Change "210" to --212-- |
| 4 | 46 | Change "being" to --is-- |
| 4 | 46 | After "document" insert --holder-- |
| 4 | 65 | After "said" insert --second-- |

Signed and Sealed this

Fourteenth Day of October, 2008

JON W. DUDAS  
*Director of the United States Patent and Trademark Office*